United States Patent [19]
Berg et al.

[11] Patent Number: 4,613,365
[45] Date of Patent: Sep. 23, 1986

[54] METHOD FOR RECOVERING PRECIOUS METALS

[75] Inventors: Hans G. Berg, Skellefteå; Sven Å. Holmström, Ursviken; Leif Johansson, Skelleftehamn, all of Sweden

[73] Assignee: Boliden Aktiebolag, Stockholm, Sweden

[21] Appl. No.: 775,251

[22] Filed: Sep. 12, 1985

[30] Foreign Application Priority Data

Sep. 28, 1984 [SE] Sweden ................................ 8404862

[51] Int. Cl.$^4$ ............................................. C22B 11/00
[52] U.S. Cl. ......................................................... 75/83
[58] Field of Search ............................................. 75/83

[56] References Cited

U.S. PATENT DOCUMENTS

| 718,087 | 1/1903 | Carpenter | 75/83 |
|---|---|---|---|
| 815,851 | 3/1906 | Merril | 75/83 |
| 1,415,526 | 5/1922 | Chykashige et al. | 75/83 |
| 1,896,807 | 2/1933 | Bauer | 75/83 |
| 2,048,152 | 7/1936 | Wise | 75/83 |

FOREIGN PATENT DOCUMENTS

| 689824 | 4/1953 | United Kingdom . |
|---|---|---|
| 1574974 | 9/1980 | United Kingdom . |
| 1601450 | 10/1981 | United Kingdom . |

Primary Examiner—Peter D. Rosenberg
Attorney, Agent, or Firm—Burns, Doane, Swecker & Mathis

[57] ABSTRACT

The invention relates to a method for pyrometallurgically recovering the precious metal content, such as gold, silver and platinum metals, of halogen-bearing materials rich in silver. The material is caused to rapidly disperse in or be finely distributed throughout an at least partially molten charge containing a non-oxidic metal-containing phase having the ability to dissolve precious metals and to substantially lower their chemical activity. The halogen content of the material herewith reacts with any fluxes or metals of high chemical activity present in the furnace charge, while forming metal halogenides. The halogenides formed are separated by slagging and/or volatilization, and the precious metals are recovered from the molten charge, depleted of halogens, in a conventional manner and with regard to the charge phases.

16 Claims, No Drawings

METHOD FOR RECOVERING PRECIOUS METALS

The present invention relates generally to a method for recovering pyrometallurgically the precious-metal content, such as gold, silver, and platinum metals, of halogen-bearing materials rich in silver. More specifically, the invention relates to a method for working-up silver-rich chloride ashes, these products being commonly available but hitherto considered economically unattractive with regard to working-up the ashes by means of pyrometallurgical processes. The invention also relates in particular to a method for recovering silver pyrometallurgically from silver chlorides. Ashes and other metal products derived from the metallurgical treatment of materials containing silver and other precious metals, together with halogens, for example in chloride form, can only be worked-up to a limited extent in conventional pyrometallurgical copper smelters. Since these materials are often highly attractive with regard to their valuable metal contents, and also with regard to their high precious metal content, such as their silver content, there is a need for a process which will enable such valuable and precious metals to be recovered in greater quantities, without the risk of losses of precious metals to the surroundings becoming a prohibitive factor. Halogen-bearing gases in general also represent a hazard to the environment. Moreover there is also the risk of releasing toxic halogenides to the surroundings.

One possible alternative to the pyrometallurgical method of working-up such materials is the hydrometallurgical method, such as leaching, although there are only a limited number of hydrometallurgical copper plants available on a worldwide basis and such plants are unable to compete economically with the pyrometallurgical copper smelters. In addition, these smelters often already incorporate process stages which enable silver, gold and other precious metals to be recovered in large yields from the raw materials worked-up in the smelter. Consequently, if it were possible to transfer the precious metal content of the chlorine bearing materials discussed in the introduction to the metal to be recovered without suffering significant losses of said precious metals in the halogenides fumed-off, these materials could be worked-up pyrometallurgically in a highly advantageous fashion, therewith rendering such processes particularly attractive.

In the prior art there are long known processes for processing different types of precious-metal containing materials using lead as collector for the precious metals recovered. Thus, in U.S. Pat. No. 718,087 silver and gold are recovered from their ores in a two-stage process comprising reverberatory smelting with molten lead. U.S. Pat. No. 815,851 teaches smelting hydrometallurgical products containing precious metals mixed with litharge and reductant and cupelling formed lead from the precious metals. U.S. Pat. No. 415,526 discloses a process for separating Se and other elements of the sulphur group and noble metals from each other by fusion with a collector, such as lead, for the noble metals. GB-A-689824 discloses extraction of precious metals from ashes or residues, for examples goldsmith's ashes and copper electrolysis sludge. The material is mixed with a lead compound and introduced into a molten slag of fayalite type. GB-A-1574274 relates to reducing smelting of waste products in a blast furnace with lead oxide and coke to form a lead smelt containing any precious metals.

Also copper is used as a precious metal collector, suchh as disclosed in GB-A-1601450, in which precious metal wastes of metallic type, such as sweeps, are smelted with copper sulphide or a copper sulphide precursor and flux, such as lime, iron oxide and silica and/or an alkali metal carbonate and chloride flux, such as a sodium carbonate and sodium chloride flux.

None of the prior art processes using lead or another metal collector for precious metals discloses processing of any halogen-bearing materials in spite of the fact that such materials, as follows from the introduction of this specification, play a very important economical part on the smelting material market. The reason is of course that they are trouble-some to process pyrometallurgically due to risks of losses and toxic pollution, as already indicated above.

The present invention, however, provides a method which enables halogen-bearing materials rich in silver to be worked-up pyrometallurgically in the absence of those technical, economical and environmental drawbacks hitherto associated with pyrometallurgical processes intended for working-up materials of the class intended here.

The invention is characterized by the procedural steps set forth in the following claims.

The halogen-bearing material rich in silver is supplied to an at least partially molten furnace charge containing a non-oxidic metal-containing phase, for example metal, matte, speiss or similar substances, in a manner which ensures that the material is finely dispersed or distributed throughout the charge and dissolved in the non-oxidic metal-containing phase as quickly as possible. The charge is selected so that at least one of the precious metals contained in the material is absorbed by and dissolved in the non-oxidic metal-containing phase at prevailing temperatures in conjunction with finely distributing or dispersing the material throughout said charge. The chemical activity of the precious metal content is greatly lowered in this way in proportion to the extent to which the charge is "thinned". Halogen present in the material charged will then react with those metals in the non-oxidic metal-containing phase which have greater activity than the precious metals. Appropriate phases in this respect are metals as lead, copper and zinc or sulphides or speisses containing the same. Depending upon the temperature of the furnace charge and the possible presence of a slag phase and its composition, the metal halogenides formed will volatilize and form slag. Consequently during this stage the non-oxidic metal-containing phase will be depleted of chlorine to a progressively increasing extent, and precious metal dissolved in said phase will be unable to fume-off in halogenide form. The non-oxidic phase is then processed in a conventional manner, to recover the precious metals therefrom. When the non-oxidic phase is comprised mainly of lead, then silver and other precious metals are recovered therefrom by the Parkes-process for example. When the non-oxidic phase is comprised mainly of copper or copper matte, the whole of the precious metal content is obtained in the form of a precious-metal sludge when electrolytically refining the copper or the copper obtained from the matte in accordance with conventional techniques, this sludge being subsequently worked-up separately with the aid of known methods.

The course followed by the reactions taking place when adding the halogen-bearing material to the furnace charge can be illustrated by the following reaction formulae, in which for the sake of simplicity the silver and halogen content of the material is assumed to exist solely in the form of silver chloride (AgCl) and the furnace charge is assumed to be lead and an oxidic slag layer.

$$AgCl(s) \rightarrow Cl + Ag_{Pb} \quad (1)$$

$$Pb(l) + 2Cl \rightarrow PbCl_2 \quad (2)$$

$$PbCl_2(l) \rightarrow XPbCl_2(g) + (1-X)PbCl_{2\,slag} \quad (3)$$

The silver chloride will thus be taken-up in the lead bath, while forming therein metallically dissolved silver and free chlorine, which probably exists temporarily in the bath in an atomic state. Atomic chlorine, however, will quickly react with the lead present to form lead chloride, which in turn is fumed-off as gaseous lead chloride ($PbCl_2$), depending upon the temperature of the bath. The percentage of chlorine fumed-off in this way has been indicated in formula (3) by the symbol X, the value of which lies close to zero at the melting point of lead chloride, but approaches 1 as the smelting temperature increases. The remainder of the chloride formed will be taken-up by any slag which might be present, or will form its own slag phase.

Consequently, during the dissolution phase the activity of the silver present, and therewith also its partial pressure, will come closer to zero.

That which has been said in the aforegoing with respect to lead also applies to a furnace charge containing large quantities of other non-oxidic metal-containing phases capable of dissolving silver and with which any silver dissolved therein will obtain a low activity. Metal halogenides formed will fume-off proportionally to the prevailing bath temperature and the vapor pressures of respective halogenide. The halogen and metal content of the gas phase can then be recovered therefrom by subjecting said phase to a conventional gas wash.

Dispersion of the halogen-bearing material throughout the furnace charge is suitably effected by utilizing a reactor vessel capable of vigorously agitating the burden, such as a Kaldo-type top-blown rotary converter.

The material can also be dispersed and smelted in a flame using oxygen-containing gas. Thus, the dispersion is rapidly obtained. Flame dispersion and smelting is applicable in connection mainly to top-blown rotary converters and flash-smelting furnaces.

The material can also be dispersed, at least when the furnace charge is completely molten or nearly so, by applying known metallurgical techniques for injecting solid materials into molten baths. This ensures extremely rapid dispersion of the material throughout the furnace charge, and therewith also dissolution of the precious metal content, while simultaneously avoiding unnecessary losses of precious-metal halogenides due to fuming-off. It also lies within the scope of the present invention to apply the method for producing silver from silver chloride, the silver chloride being charged to a molten lead bath. In this case fuming-off of the chloride should be avoided, and hence the temperature of the lead bath is preferably maintained as close as possible to the melting point of the lead chloride (500° C.). In order to ensure that as little lead as possible is consumed at this bath temperature, the weight ratio of lead to silver chloride is about 3:1.

The invention will now be described in more detail with reference to a preferred embodiment as applied when processing silver-rich and chlorine-rich ashes carried out in a top-blown rotary converter of the Kaldo-type, and with reference to working examples.

Ash rich in silver and chlorine is charged to a Kaldo converter together with lead oxide/sulphate pellets or lead concentrate together with reductants and fluxing agents, all charge constituents being well mixed together. The mixture is smelted progressively while supplying heat from an oil-oxygen burner, therewith to form a charge which comprises a molten lead phase and slag and which is at least partially molten initially. The temperature of the charge lies between 500° and 1200° C., depending upon the point reached in the smelting cycle. Thus, during the initial stage of the smelting cycle the temperature is as low as 500°–800° C., and the charge is consequently only partially molten. At the end of the smelting cycle a temperature is reached at which the whole charge becomes molten, inter alia to enable the slag to be tapped from the converter.

The smelting process is carried out while rotating the converter in a manner such that the silver bearing material will dissolve rapidly in the lead bath formed, in the manner previously described. Thus, by rotating the furnace the solid silver-rich material is rapidly dispersed throughout the lead bath formed. Chlorine released as silver dissolves in the molten lead will then react with elements of high activity in the bath. These elements have a great affinity to chlorine and other halogens, and are, in addition to lead, zinc and iron for example, which may be present in substantial quantities in both lead pellets and lead concentrate, in ash form. Metal chlorides will then fume-off, although the amount of chlorine charged in ash form is—at least when the furnace charge is based on lead pellets—relatively restricted in relation to the total chlorine content of the furnace charge, because of the chlorine content of the lead material. For example, if the mixture incorporates 5% of an ash containing about 3% Cl this will represent a sole increase in the total chlorine content of the charge of about 15%, with respect to the normal chlorine content of lead pellets, and dusting will thus only increase marginally. The chlorine-containing dust is extracted from the process gas in the gas cleansing system of the Kaldo-furnace complex.

EXAMPLE 1

A first series of tests was carried out with the simplest system, i.e. a single AgCl-Pb system, in order to illustrate, inter alia, the surprisingly good yield of silver to the lead phase and the small metal losses which can be obtained through fuming-off if found desirable.

The tests were carried out on a laboratory scale and the amount of silver chloride used in each test was 70 g. In tests 1 and 2 pulverized lead and silver chloride were mixed together as thoroughly as possible prior to charging the mixture to a crucible, in which the mixture was smelted. In test 3 first lead and then chloride were charged to the crucible, while in test 4 the chloride was charged to the bottom of the crucible. The following results were obtained in the tests.

| Test No | Pb/AgCl weight ratio | Temp max °C. | Obtained phases (gram) | | | % Ag in PbCl$_2$ | Yield % Ag to Pb |
| --- | --- | --- | --- | --- | --- | --- | --- |
| | | | Pb | PbCl | Fumed-off | | |
| 1 | 2.0 | 700 | 141 | 67 | 0.9 | 0.59 | 90.0 |
| 2 | 2.9 | 580 | 200 | 69 | 0.1 | 0.22 | 99.6 |
| 3 | 3.0 | 585 | 211 | 68 | 0.2 | 0.25 | 99.4 |
| 4 | 3.0 | 680 | 211 | 69 | 0.3 | 0.34 | 99.1 |

The amount of lead-chloride phase formed can be compared with the theoretical quantity 69.2 g capable of being formed purely stoichiometrically. It will be observed that the amount of silver yielded to the lead phase was extremely high.

EXAMPLE 2

An ash containing 3% Cu, 22% Zn, 5% Fe, 1.1% Ag, 60 g/t Au and 3.3% Cl was mixed with pellets of an oxidic-sulphatic lead raw material having the following composition:

4.0% Pb, 12% Zn, 1.1% Cu, 8% S and 1.5% Cl such as to form a furnace charge of the following major composition:

36% Pb, 13% Zn, 1.3% Cu, 0.1% Ag, 6 g/t Au, 7.2% S and 1.7% Cl 25 tons of the mixture were charged to a Kaldo-furnace together with 2 tons of coke and fluxing agent, whereafter the charge was heated while rotating the furnace at 10 rpm for a period of 150 minutes, said charge being heated with the aid of an oil-gas burner to melting temperature, such as to form a molten lead bath and a slag. When the whole of the furnace charge was found to have melted, 8.5 tons of raw molten lead containing 0.29% Ag and 18 g/t Au where removed from the furnace, together with 13 tons of slag containing 0.3% Cl. Thus, 99.5% of the silver charged and practically all of the gold content had been absorbed by and dissolved in the lead. Of the chlorine charged, about 90% had fumed-off in the form of different metal chlorides and about 10% had been absorbed in the slag.

We claim:

1. A method for pyrometallurgically recovering the precious metal content from halogen-bearing material comprising:
   (a) dispersing the material throughout an at least partially molten furnace charge containing a non-oxidic metal-containing phase capable of dissolving precious metals whereby the chemical activity thereof is lowered, precious metal is retained in the molten metal phase or forms a matte phase and halogen from the material reacts to form metal halide;
   (b) separating the metal halide from the precious metal containing phase; and
   (c) recovering precious metal from the precious metal containing phase.

2. The method of claim 1 wherein the material is dispersed by injecting the material in the furnace charge.

3. The method of claim 1 wherein the material is dispersed by introducing the material into the furnace charge and agitating the furnace charge.

4. The method of claim 3 wherein the agitation is achieved by rotating a top-blown rotary converter.

5. The method of claim 1 wherein the material is dispersed and smelted in a flame.

6. The method of claim 5 wherein the furnace is a flash-smelting furnace.

7. The method of claim 5 wherein the non-oxidic metal containing phase is composed of a molten lead bath.

8. The method of claim 3 wherein the non-oxidic metal containing phase is composed of a molten lead bath.

9. The method of claim 1 wherein the non-oxidic metal containing phase is composed of a molten lead bath.

10. The method of claim 5 wherein the non-oxidic metal containing phase is composed of a molten copper or copper matte phase and wherein precious metal is recovered by electrolysis using copper anodes.

11. The method of claim 3 wherein the non-oxidic metal containing phase is composed of a molten copper or copper matte phase and wherein precious metal is recovered by electrolysis using copper anodes.

12. The method of claim 1 wherein the non-oxidic metal containing phase is composed of a molten copper or copper matte phase and wherein precious metal is recovered by electrolysis using copper anodes.

13. The method of claim 1 wherein the material contains silver chloride and the non-oxidic metal containing phase is composed of molten lead and wherein the metal halide is lead chloride which is slagged off and silver is recovered by oxidizing the lead and separating the formed lead oxide phase from a silver metal phase.

14. The method of claim 9 wherein the metal halide is separated by slagging and removed from the furnace.

15. The method of claim 1 wherein the metal halide is volatilized and removed from the furnace.

16. The method of claim 1 wherein the furnace charge includes a flux.

* * * * *

UNITED STATES PATENT AND TRADEMARK OFFICE
CERTIFICATE OF CORRECTION

PATENT NO. :     4,613,365
DATED      :     September 23, 1986
INVENTOR(S) :    Berg et al It is certified that error appears in the above-identified patent and that said Letters Patent is hereby corrected as shown below:

Claim 14, line 1, amend "9" to --1--.

Signed and Sealed this

Twentieth Day of January, 1987

Attest:

DONALD J. QUIGG

*Attesting Officer*     *Commissioner of Patents and Trademarks*